June 4, 1963 R. V. COLES 3,091,919
OPERATOR WITH THERMOELECTRIC CONTROL
Filed April 4, 1960
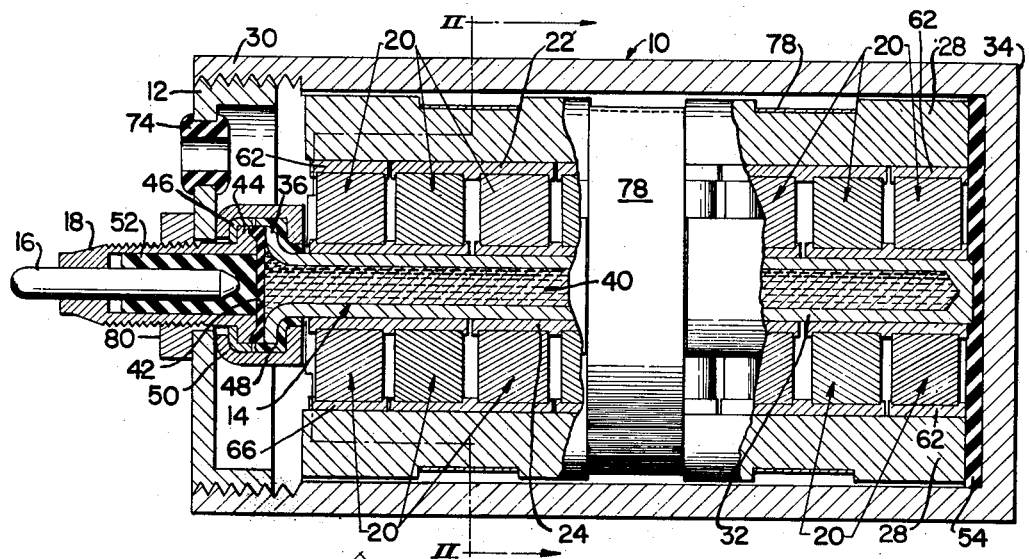
Fig. 1.
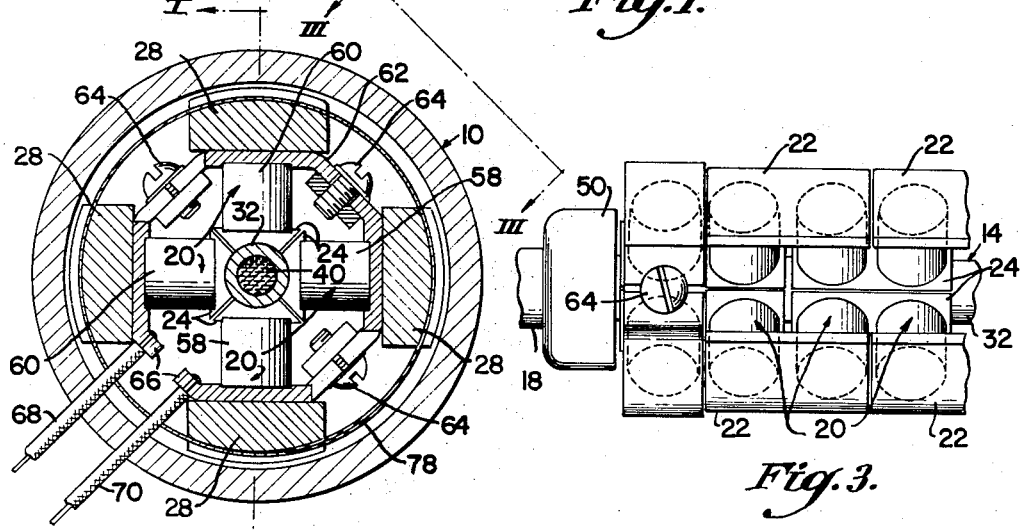
Fig. 2.
Fig. 3.
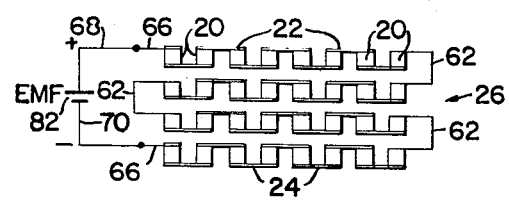
Fig. 4.

United States Patent Office  3,091,919
Patented June 4, 1963

3,091,919
OPERATOR WITH THERMOELECTRIC CONTROL
Ralph V. Coles, London, England, assignor to Robertshaw-Fulton Controls Company, Richmond, Va., a corporation of Delaware
Filed Apr. 4, 1960, Ser. No. 19,706
4 Claims. (Cl. 60—23)

This invention relates to a thermoelectric powered motor and more particularly to a thermoelectric powered motor utilizing thermally responsive devices and the heating and cooling effect thereof for power output.

It is well known that materials, such as bismuth telluride and lead telluride, possess known properties of semiconductors and can be arranged to form couples of p and n materials. When these couples are subjected to direct current electrical energy, one set of junctions exhibit either a cooling effect whereby heat is absorbed, or, if the direction of the direct current electrical energy is reversed, a heating effect whereby heat is generated. The addition or subtraction of heat from a system of couples can be controlled within limits by varying the magnitude and direction of the direct current therethrough.

If a system to which heat is added to or subtracted from contains a thermally responsive device, the characteristics of the thermally responsive device can be controlled by varying the magnitude and direction of the direct current through the system. Thermally responsive devices that can be controlled by a thermoelectric system can be of: the differential expansion type, such as bimetals; volumetric expansion type, such as liquid or vapor filled bellows; change of state type, such as solid to liquid or liquid to gas devices; and devices utilizing the dimensional change of allotropic materials.

Of particular interest are change of state type of thermally responsive devices which devices are capable of exerting great forces at the transition point of the material due to the expansion or contraction that occurs as the material changes from a solid to a liquid or, conversely, from a liquid to a solid. In addition, change of state type of thermally responsive devices are insensitive to pressure changes. Attempts have been made to use this phenomena in work performing devices but these applications have not proven satisfactory, particularly where the heat generation or extraction has been applied in the form of electrical energy, switched on and off in response to a control signal. In these instances, the change of state device has been heated to its transition point, at which point it has been necessary to allow the material contained therein to cool by natural means, such as radiation, conduction, or convection, which means have been found to be too slow to give a satisfactory response. It is evident that if the rate of heating and cooling of any of these thermally responsive devices can be increased, a vast number of applications of work performing devices can be evolved.

An object of this invention is a novel motor powered by a thermoelectric device.

Another object of this invention is to power a motor by a pressure insensitive thermally responsive device actuated by a thermoelectric element.

A further object of this invention is to obtain reciprocal motion from a heat motor powered by a change of state thermally responsive device actuated by a thermoelectric-element.

Still another object of this invention is to power a heat motor by a thermally responsive device actuated within a predetermined range of temperatures by a thermoelectric element.

Another object of this invention is to utilize thermoelectric elements to control the power output of a thermally responsive device.

Still another object of this invention is to control the transition point of a change of state thermally responsive device by a plurality of thermoelectric elements.

In the preferred embodiment of this invention, a plurality of series connected thermoelectric elements are positioned so that one set of junctions is adjacent to an elongated change of state thermally responsive device. Heat generation or heat absorption is determined by the direction and magnitude of direct current flow through the thermoelectric elements. A motion transmitting operator connected to the thermally responsive device transmits reciprocal movement to a work device in response to heat generation or heat absorption in the thermoelectric elements, thereby constituting a thermoelectrically power motor.

These and other objects and advantages will become apparent from the following description taken in connection with the accompanying drawings wherein:

FIG. 1 is a longitudinal partial sectional view of the thermoelectric motor taken along the line I—I of FIG. 2;

FIG. 2 is a cross sectional view taken along the line II—II of FIG. 1;

FIG. 3 is a partial perspective view of the thermoelectric motor with certain parts removed and as viewed from line III—III of FIG. 2; and FIG. 4 is a circuit diagram of the series connected thermoelectric elements.

Referring more particularly to the drawings, the thermoelectric motor comprises a cylindrical cup-shaped casing 10 having a threadedly coupled end wall cap 12. An elongated thermally responsive member 14 is disposed within the casing and has an operatively connected motor transmitting operator 16 extending through a stem guide 18 in the end wall 12. A plurality of thermoelectric elements 20 are disposed within casing 10 and are radially positioned about elongated thermally responsive member 14. A plurality of electrical conductors 22 and 24 alternately connect to opposite ends of adjacent thermoelectric elements 20 to form a series connected thermoelectric device 26. A plurality of electrically insulated heat conducting elongated members 28 are disposed longitudinally of casing 10 adjacent the radially outward ends of thermoelectric elements 20.

The cylindrical casing 10 is preferably formed of a structural material suitable to protect the thermoelectric device contained therein. A portion of the inner surface of casing 10 on the open end 30 is tapped with threads so as to accommodate an externally threaded end wall cap 12. Centrally disposed in end wall cap 12 is an aperture of a suitable size to accommodate a cup-shaped stem guide 18 therein. The end cap 12, similar to the casing 10, should be formed of a structural material suitable to protect the thermoelectric device and support the stem guide 18.

Thermally responsive device 14 comprises a substantially elongated thin cylindrical cup 32 extending substantially the distance between the end wall 12 and the base portion 34 of the casing 10. Preferably, cup 32 is formed from a high heat transfer material, such as copper. The elongated cup 32 is provided with a flange 36 at its open end and is filled with a charging material 40, such as a copper-filled wax charge, which changes from a solid to a liquid at a preselected temperature with accompanying expansion. It will be apparent that other materials having the change of state characteristics required can be substituted and the invention is not to be limited to the particular material herein described.

Flange 36 supports an elastic diaphragm element 42 which closes the open end of cup 32. Diaphragm element 42 is adapted to be moved partially into the central opening of stem guide 18 upon expansion of charge 40 as will later be apparent. The stem guide 18 has a flanged portion 44 radially extending outwardly, which flange portion engages and is seated upon diaphragm 42 leaving the central portion thereof free. A ring 46 peripherally engages flange portion 44 of stem guide 18 and is disposed on the opposite side of flange portion 44 from elastic diaphragm 42.

A ring-shaped thermal insulator 48, made of any suitable material such as a plastic, peripherally engages flange 36 of elongated cup 32. The stem guide 18 and the elongated cup 32 are secured together, with diaphragm 42 disposed therebetween, by clamping means in the form of a ferrule 50 which is crimped, spun or otherwise secured in engagement with flanges 36 and 44 respectively.

An apertured cylindrical plug member 52 of elastic material, such as rubber, forms a stem seat and extends into stem guide 18 and operatively engages elastic diaphragm element 42. The plug member 52 is preferably made of oversized dimensions compared with the hollow interior of the stem guide 18 so as to be confined therein under pressure.

An actuator 16 in the form of a plunger is carried in the aperture plug member 52 and extends through an aperture in stem guide 18. Actuator 16 normally fills the aperture when the thermal element is below a preselected temperature sufficient to change the state of the filling material 40. As the filling material 40 is compressed within the cup 32, actuator 16 is securely held within the aperture of plug member 52 and is not easily dislodged therefrom, while still being operable for reciprocal movement relative to the aperture in the end wall of stem guide 18.

In the normal operation of such a device, actuator 16 is reciprocal relative to stem guide 18 and projects therefrom into engagement with the device (not shown) to be actuated. Such operation occurs upon expansion of filling material 40 at a preselected temperature sufficient to change it from a solid state to a liquid state. Upon expansion of filling material 40, diaphragm element 42 becomes extruded into the central opening of the flange portion 44 of stem guide 18. Actuator 16 is reciprocated relative to stem guide 18 since movement of diaphragm 42 causes depression and distortion of plug member 52.

The inner wall surface of base portion 34 of cup-shaped casing 10 has an electrically insulated disc 54 to electrically insulate and rigidly support the elongated cup 32. Consequently, any expansion of the charge 40 will only be reflected in distortion of the rubber diaphragm 42.

Radially surrounding and extending longitudinally substantially the length of elongated cup 32 are four rows of copper segments 24, each row having at least three segments per row. Each of copper segments 24 is electrically insulated from cup 32 and each other by an electrical insulating material, such as a varnish or other suitable paint. Affixed electrically and mechanically to each segment 24 is an "n" type thermoelectric element 58 and a "p" type thermoelectric element 60 formed from cylindrically-shaped elements of bismuth telluride. The junctions of each of the thermoelectric elements 20 with copper segments 24 form the working junctions which are thermally connected in parallel by elongated cup 32. As shown in FIG. 2, the copper segments 24 have an arc-shaped portion of substantially the same radius as the outer surface radius of cup 32 formed therein so as to obtain the maximum surface contact area between the elongated copper cup 32 and the copper segments 24.

The thermoelectric elements 20 are connected in series electrically by copper busses 22 which form passive junctions at the opposite ends of thermoelectric elements 20.

As shown in FIGS. 2 and 3, the end thermoelectric element 20 of each row of thermoelectric elements is electrically connected in series to an adjacent thermoelectric element 20 in an adjacent row by an arcuately-shaped copper bus 62 and a nut and bolt assembly 64 located therein for assembly purposes. As shown in FIG. 2, one end of each of two adjacent thermoelectric element rows are connected by similarly-shaped copper terminals 66 which have electrical conductors 68 and 70 secured thereto by any suitable means, such as soldering 72. In FIG. 1, a rubber grommet 74 is located in threaded end wall 12 to accommodate the suitable electrical conductors as shown in FIG. 2.

As further shown in FIGS. 1 and 2, the copper busses 22, 62, and 66 forming the passive junctions of the thermoelectric elements 20 are thermally connected in parallel along substantially the entire length of copper cup 32 by electrically insulated elongated bars 28 made of any high heat conducting material, such as aluminum. These bars are held in contact with the passive junctions by a plurality of substantially circular constraining springs 78, which springs also hold the thermoelectric elements 20 and their corresponding copper cup-shaped segments 24 in contact with the copper cup 32 at the working junctions to form a unitary assembled structure.

The end of the elongated copper cup 32 rests on an electrically insulating disc 54 which safeguards against electrical shorting. After the assembled structure is positioned in casing 10, threaded end cap 12 is threadedly engaged thereto, after which a suitable nut 80 is threadedly engaged with the stem guide 18 to securely position the assembled thermoelectric elements 20 and thermally responsive device 14 in position within casing 10.

In operation, conductor 68 is connected to the positive terminal of an appropriate high-current low-voltage direct current power source 82 and conductor 70 is connected to the negative terminal. Direct current, therefore, will alternately flow through "p" type thermoelectric elements and "n" type thermoelectric elements and return to the power source 82. With current flow in this direction, the working junctions will heat and the passive junctions will cool. The heat generated at the working junctions will be conducted from the copper segments 22 to the elongated cup 32 and then to the copper filled wax charge 40. As the temperature of the charge 40 rises, slight expansion will occur until the melting point of the charge is reached, at which time the charge will greatly expand in a very short period of time, as the charge changes from its solid state to its liquid state.

The expansion of the charge is transmitted through diaphragm 42 and plug member 52, causing actuator 16 to move outwardly with considerable force against a load.

Upon reversing the direct current through the leads 68 and 70, which can easily be accomplished by a switching means (not shown), the working junctions will rapidly cool, thus rapidly absorbing heat from the elongated copper cup 32 and the copper filled wax charge 40, to thereby cause the charge to return from the liquid state to the solid state with the accompanying contraction of the material. Upon contraction, the rubber diaphragm 42, plug 52 and actuator 16 are returned to their original position.

As described above, when the working junction is being heated, the passive junction is being cooled in accordance with the operation of thermoelectric elements. The passive junction, therefore, will absorb heat from a heat sink which comprises the elongated bars 28, casing 10, and the surrounding air. When the working junction is being cooled, the passive junction is heated, which heat is transmitted to the heat conducting bars 28.

It is readily apparent, therefore, that temperature control of elongated cup 32 can also easily be obtained by a separate temperature responsive device (not shown), which device can be operatively connected electrically to another switching means (not shown), which switching means can determine the direction of direct current flow through the series of thermoelectric elements 20 to thereby maintain the charge in the elongated cup 32 at substantially its transition point.

It is obvious that upon actuation of the control switch (not shown), the direct current, actuating thermoelectric elements 20, can be rapidly reversed so as to provide the desired results and to obtain reciprocal motion from this motor. It will readily be seen that a thermoelectric powered motor of the type described above can readily be adapted to actuate a variety of control elements adapted for positive displacement movement, such as control valves, dampers, etc., in response to a low level electrical control signal.

It will be apparent that many changes can be made in the details of construction and arrangement of parts described herein without departing from the scope of the invention as defined in the appended claims.

I claim:

1. An actuator assembly comprising a thermally conducting envelope forming a heat sink to the ambient atmosphere, an elongated tubular container having a closed end, an open end, and a thermally conducting lateral wall, said container being coaxially aligned with said envelope, a diaphragm closing said open end of said tubular container, a mass of material expansible upon fusion filling said tubular container, a receptacle extending beyond said envelope and in substantial alignment with said tubular container at said diaphragm-closed end thereof, an actuating member within said receptacle and extending therebeyond at one end and substantially to said diaphragm at the other end thereof, resilient means within said receptacle retaining said actuator therein and effective to transfer diaphragm motion thereto, heat conducting means having substantially cylindrical cavity walls in thermal contact throughout the length of said tubular container, said heat conducting means comprising a plurality of insulated longitudinal sections, a series of semi-conductor heat pump elements in contact with said sections, respectively, being serially connected, heat conducting means in contact with opposite ends of said semi-conductor elements in each row thereof opposite said sections, means conducting heat from said heat conductor elements to said elevelope, and means energizing said heat pump elements alternatively in opposite polarities in a manner to transfer heat inwardly toward said tubular container for one polarity and outwardly toward said heat conducting members in the other polarity.

2. A motor for connection to a source of electrical power comprising a power output means, a tubular thermally responsive device being filled with a material suitable to undergo a change of state, a plurality of semiconductor-like thermoelectrically dissimilar conductors, heat transfer conductors operably connecting each pair of said dissimilar conductors in electric circuit and being positioned between said thermoelectric conductors and said thermally responsive device, one side of each of said heat transfer conductors being formed with reverse curved configuration to accept the surface configuration of said thermally responsive device, the other side of each of said heat transfer conductors being formed to accept said semiconductor-like conductors, said heat transfer conductors being disposed over substantially the entire surface of said tubular thermally responsive device, and means for connecting said circuit to the source of electrical power.

3. A motor for connection to a source of electrical power comprising a power output means, an elongated tubular thermally responsive device filled with a thermally expansible material and operatively connected to said power output means, a plurality of semiconductor-like thermoelectrically dissimilar conductors, means operably connecting pairs of said dissimilar conductors in electric circuit along substantially the length of said thermally responsive device, said means being disposed radially about the tubular periphery of said thermally responsive device and in heat transfer relation with substantially the entire surface of said device, and means for connecting said circuit to the source of electrical power.

4. A motor for connection to a source of electrical power comprising a power output means, a thermally responsive device filled with a thermally expansible material and operatively connected to said power output means, a heat sink, a plurality of semi-conductor-like thermoelectrically dissimilar conductors operably joined in circuit and disposed between said thermally responsive means and said heat sink to form a plurality of thermoelectric junctions which are heat producing when current flows in one direction in said circuit and heat absorbing when current flows in the opposite direction, and a plurality of thermoelectric junctions which are heat absorbing when current flows in said one direction and heat producing when current flows in said opposite direction, one of said plurality of junctions disposed in heat transfer relation with said thermally responsive device and the other of said plurality of junctions disposed in heat transfer relation with said heat sink, one or more constraining spring members extending about the outer periphery formed by said sink, said conductors and said device retaining said heat sink, said conductors and said device in position, and means for connecting said circuit to the source of electric energy.

References Cited in the file of this patent
UNITED STATES PATENTS

| | | |
|---|---|---|
| 420,641 | Dewey | Feb. 4, 1890 |
| 2,838,943 | Modes et al. | June 17, 1958 |
| 2,936,125 | Leins | May 10, 1960 |
| 2,989,281 | Fritts | June 20, 1961 |